United States Patent
Alano et al.

(10) Patent No.: US 9,995,193 B2
(45) Date of Patent: Jun. 12, 2018

(54) MIXER WITH SWIRL BOX FOR A VEHICLE EXHAUST SYSTEM

(71) Applicant: Faurecia Emissions Control Technologies, USA, LLC, Columbus, IN (US)

(72) Inventors: Eduardo Alano, Columbus, IN (US); Jonathan Scott, Indianapolis, IN (US)

(73) Assignee: FAURECIA EMISSIONS CONTROL TECHNOLOGIES USA, LLC, Columbus, IN (US)

( * ) Notice: Subject to any disclaimer, the term of this patent is extended or adjusted under 35 U.S.C. 154(b) by 78 days.

(21) Appl. No.: 14/900,641

(22) PCT Filed: Jul. 25, 2013

(86) PCT No.: PCT/US2013/051935
§ 371 (c)(1),
(2) Date: Dec. 22, 2015

(87) PCT Pub. No.: WO2015/012829
PCT Pub. Date: Jan. 29, 2015

(65) Prior Publication Data
US 2016/0138454 A1    May 19, 2016

(51) Int. Cl.
*B01D 50/00* (2006.01)
*F01N 3/20* (2006.01)
(Continued)

(52) U.S. Cl.
CPC ....... *F01N 3/2066* (2013.01); *B01D 53/9431* (2013.01); *F01N 3/208* (2013.01);
(Continued)

(58) Field of Classification Search
CPC ...... F01N 3/208; F01N 3/2892; F01N 3/2066; F01N 2240/20; F01N 2610/1453; F01N 2610/02
(Continued)

(56) References Cited

U.S. PATENT DOCUMENTS 6,449,947 B1    9/2002  Liu et al.
7,448,206 B2 *  11/2008 Meingast ............ B01F 3/04049
                                                    239/433
(Continued)

FOREIGN PATENT DOCUMENTS

DE    102007034316 A1   1/2009
EP       1060329 B1     2/1999
(Continued)

*Primary Examiner* — Tom P Duong
(74) *Attorney, Agent, or Firm* — Carlson, Gaskey & Olds, P.C.

(57) ABSTRACT

A vehicle exhaust system includes a mixer and a doser that sprays a reducing agent into the mixer to be thoroughly mixed with engine exhaust gases prior to introduction of the mixture into a downstream exhaust component. The mixer includes an upstream baffle with at least one inlet opening and a downstream baffle with at least one outlet opening. An outer peripheral wall surrounds the upstream and downstream baffle and includes a doser opening. A doser is mounted at the doser opening and is configured to spray a reducing agent into an area between the upstream and downstream baffles. A deflector is positioned between the inlet opening and the doser opening to protect spray at the doser opening from direct impact with exhaust gas from the inlet opening, and an impactor is positioned adjacent the deflector and faces the doser opening.

19 Claims, 10 Drawing Sheets

(51) Int. Cl.
    *B01D 53/94* (2006.01)
    *F01N 3/28* (2006.01)
(52) U.S. Cl.
    CPC ........ *F01N 3/2892* (2013.01); *F01N 2240/20* (2013.01); *F01N 2610/02* (2013.01); *F01N 2610/1453* (2013.01); *Y02T 10/24* (2013.01)
(58) Field of Classification Search
    USPC .................................................. 422/168, 176
    See application file for complete search history.

(56) References Cited

U.S. PATENT DOCUMENTS

| | | | |
|---|---|---|---|
| 9,057,312 B2 * | 6/2015 | Munnannur | .......... F01N 3/2892 |
| 9,266,075 B2 * | 2/2016 | Chapman | .............. F01N 3/2066 |
| 9,719,397 B2 * | 8/2017 | Alano | ................... F01N 3/2892 |
| 2009/0084094 A1 | 4/2009 | Goss et al. | |
| 2009/0249769 A1 | 10/2009 | Flanagan et al. | |
| 2011/0094206 A1 * | 4/2011 | Liu | ....................... F01N 3/2066 60/274 |
| 2011/0239631 A1 | 10/2011 | Bui et al. | |
| 2012/0204541 A1 * | 8/2012 | Li | ....................... B01F 3/04049 60/274 |
| 2012/0216513 A1 | 8/2012 | Greber et al. | |

FOREIGN PATENT DOCUMENTS

| | | |
|---|---|---|
| EP | 2492465 A1 | 1/2012 |
| EP | 2551481 A | 6/2012 |
| WO | 2009098096 A1 | 8/2009 |
| WO | 2013010700 A1 | 1/2013 |

* cited by examiner

MIXER WITH SWIRL BOX FOR A VEHICLE EXHAUST SYSTEM

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF) or a reducing agent, such as a solution of urea and water for example, upstream of a selective catalytic reduction (SCR) catalyst. A mixer is positioned upstream of the SCR catalyst and mixes engine exhaust gases and products of urea transformation.

The doser typically sprays the urea into the exhaust stream. In one known configuration, the doser is mounted to an outer peripheral surface of the mixer and directs the spray radially inwardly toward a center of the mixer. The spray tends to have a larger droplet size in order to provide a high spray penetration such that the droplets are spread across the entire exhaust cross-section. However, smaller droplet sizes are preferred as droplets with smaller diameters evaporate more quickly than larger diameter droplets. Due to packaging constraints it is important to provide a compact configuration for the mixer by minimizing the length of the mixer. Typically, mixers having a short length also have a large exhaust flow cross-sectional area. This is disadvantageous when using smaller droplet sizes as the droplets tend not to penetrate sufficiently into the exhaust flow. Thus, having the desired shorter mixing length and the desired smaller spray droplet size are at odds with each other. Not only must the droplets have a high spray penetration, the droplets must be distributed evenly.

SUMMARY OF THE INVENTION

In one exemplary embodiment, a vehicle exhaust system includes a mixer and a doser that sprays a reducing agent into the mixer to be thoroughly mixed with engine exhaust gases prior to introduction of the mixture into a downstream exhaust component. The mixer includes an upstream baffle with at least one inlet opening and a downstream baffle with at least one outlet opening. An outer peripheral wall surrounds the upstream and downstream baffle and includes a doser opening. A doser is mounted at the doser opening and is configured to spray a reducing agent into an area between the upstream and downstream baffles. A deflector is positioned between the inlet opening and the doser opening to protect spray at the doser opening from direct impact with exhaust gas from the inlet opening, and an impactor is positioned adjacent to the deflector and faces the doser opening.

In a further embodiment of the above, the outer peripheral wall defines a central mixer axis and the doser defines a central doser axis that does not intersect the central mixer axis. In one example, a portion of the impactor intersects the central doser axis.

In a further embodiment of any of the above, the impactor and the doser are separated from each other by a gap.

In another exemplary embodiment, the deflector has a first portion fixed to the upstream baffle and a second portion fixed to the downstream baffle In a further embodiment of any of the above, the first and second portions are non-coplanar.

In a further embodiment of any of the above, the impactor is only fixed to the downstream baffle and is separated from the upstream baffle by a gap.

In another exemplary embodiment, a vehicle exhaust system includes a mixer having an inlet end configured to receive engine exhaust gases and an outlet end configured to conduct engine exhaust gases to a downstream exhaust component. The mixer includes an upstream baffle with at least one inlet opening and a downstream baffle with an outlet opening, with the upstream and downstream baffles being surrounded by an outer peripheral wall. A doser is configured to spray a reducing agent into the mixer. The doser defines a central doser axis and is mounted at a doser opening within the outer peripheral wall. A deflector is positioned within the mixer between the inlet opening and the doser opening to protect spray at the doser opening from direct impact with exhaust gas introduced into the mixer via the inlet opening. An impactor is positioned within the mixer such that a portion of the impactor intersects the doser axis.

In a further embodiment of any of the above, at least one inlet opening comprises a plurality of openings with one of the plurality of the openings being larger than the remaining openings such that a majority of the engine exhaust gases flow through the one opening, and wherein the deflector is positioned between the one opening and the doser opening.

In a further embodiment of any of the above, the exhaust gas enters the inlet opening, swirls around a first side edge of the impactor and is directed along a front face of impactor to mix with droplets entering the mixer via the doser opening. Then, a mixture of exhaust gas and droplets is directed by a pressure differential toward the upstream baffle and then across the upstream baffle toward the center of the mixer.

These and other features of this application will be best understood from the following specification and drawings, the following of which is a brief description.

DETAILED DESCRIPTION

Figure 1:
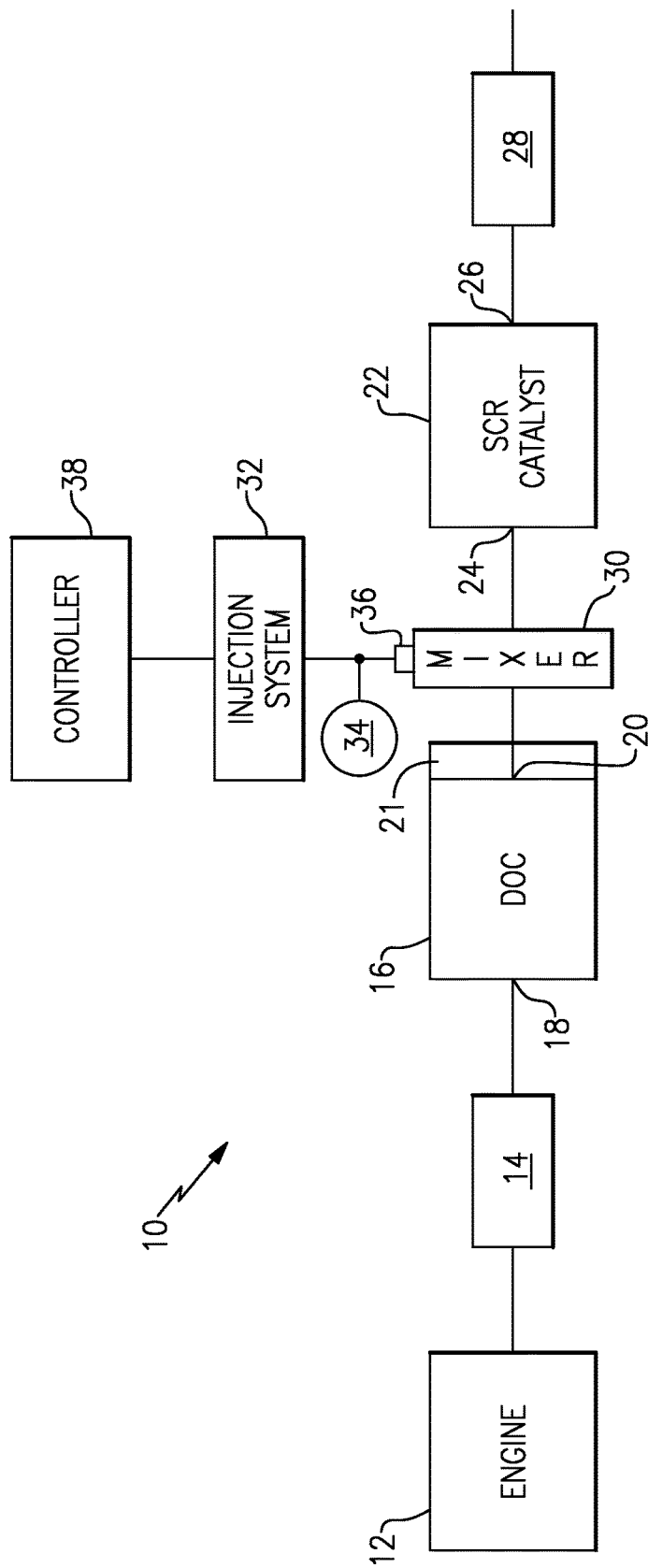
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

Figure 8:
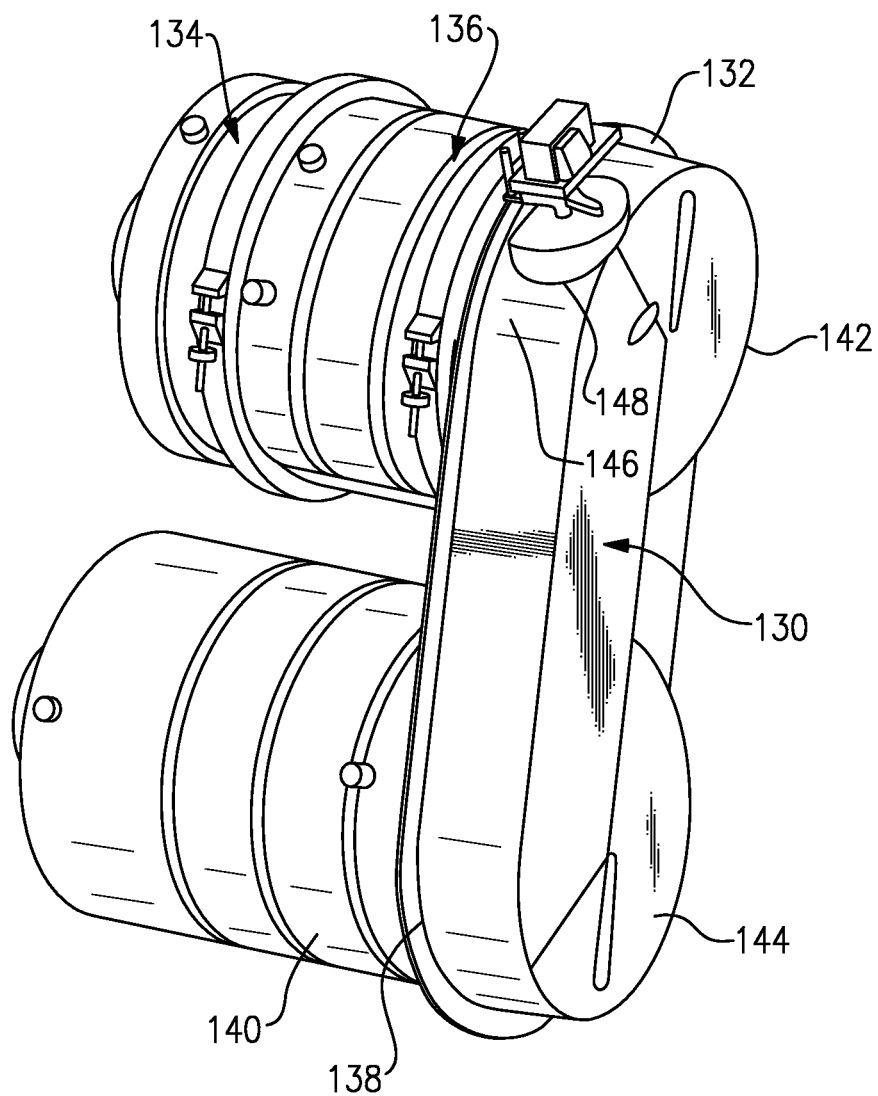
FIG. 8 shows another embodiment of a mixer or swirl box having a U-shape configuration.

A mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 (in-line configuration) is used to generate a swirling or rotary motion of the exhaust gas. A parallel U-shape configuration for the mixer is shown in FIG. 8, and will be discussed in further detail below. Any type of mixing element can be used in either configuration. One example of a mixer in an in-line configuration is set forth in U.S. 2012/0216513 for example, which is assigned to the assignee of the present invention and is herein incorporated by reference.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known.

Figure 2:
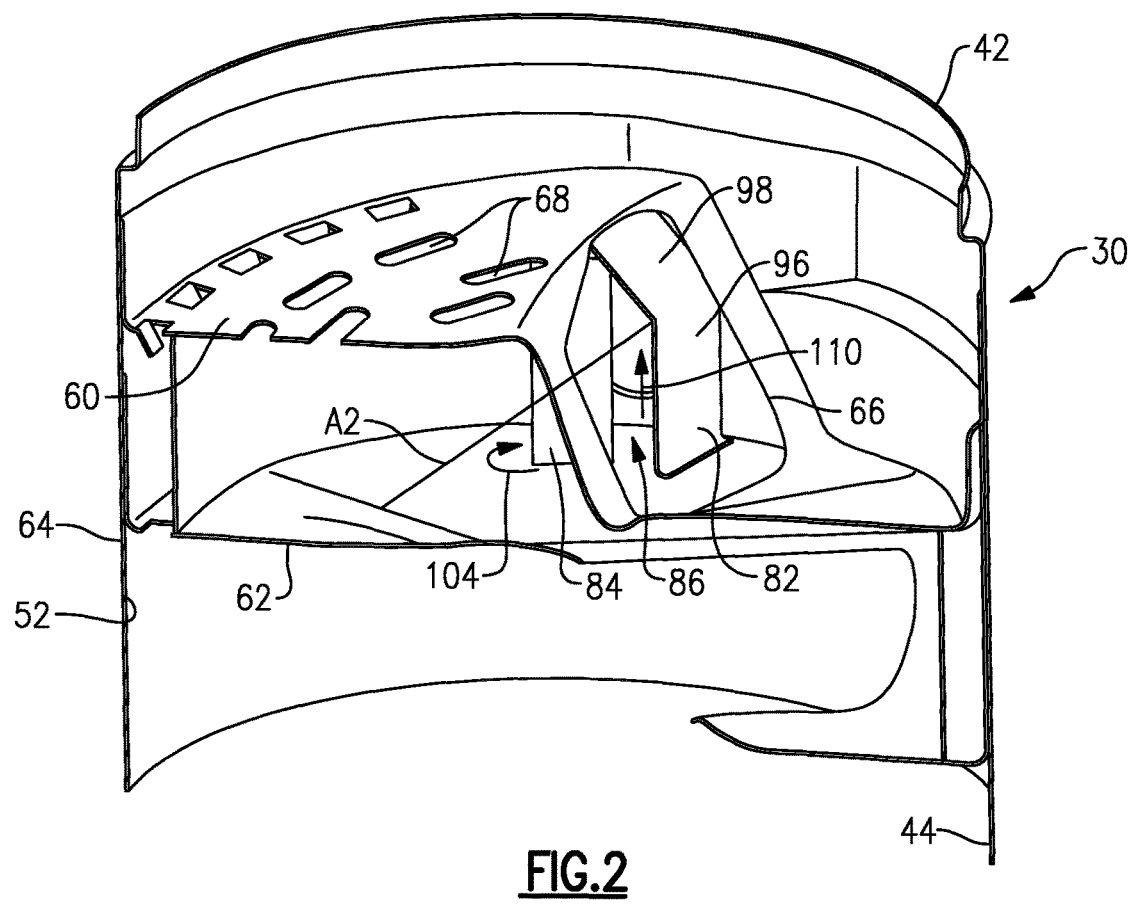
FIG. 2 is a side view in partial section of the mixer of FIG. 1.

The mixer 30 is shown in greater detail in FIGS. 2-7. As shown in FIG. 2, the mixer 30 comprises a mixer body having an inlet end 42 configured to receive the engine exhaust gases and an outlet end 44 to direct a mixture of swirling engine exhaust gas and products transformed from urea to the SCR catalyst 22. Further, the mixer body includes an upstream baffle 60 and a downstream baffle 62 that are surrounded by an outer peripheral wall 64. The upstream baffle 60 is configured to initiate swirling of the exhaust gas flow. The mixer also includes an inner peripheral surface 52 that faces inwardly toward a center of the mixer 30.

The upstream baffle 60 at the inlet 42 includes a large inlet opening 66 that receives the majority of the exhaust gas (for example, the large inlet opening 66 receives at least 60% of the exhaust mass flow rate), and which is configured to initiate the swirling motion. The upstream baffle 60 also includes a plurality of perforations, slots, or additional inlet openings 68 that ensure optimal homogenization of exhaust gases and reduces back pressure. The upstream baffle 60 and the plurality of inlet openings 66, 68 cooperate to initiate a swirling motion to the exhaust gas as the exhaust gas enters the inlet end 42 of the mixer 30.

The downstream baffle 62 includes a plurality of outlet openings 70 (FIG. 7) and deflector portions 72 through which the exhaust gas exits. Additional details regarding the operation of the upstream 60 and downstream 62 baffles can be found in U.S. 2012/0216513 and U.S. application Ser. Nos. 12/57693, 12/57886, and 12/57768 which are also assigned to the assignee of the present application and are hereby incorporated by reference.

Figure 7:
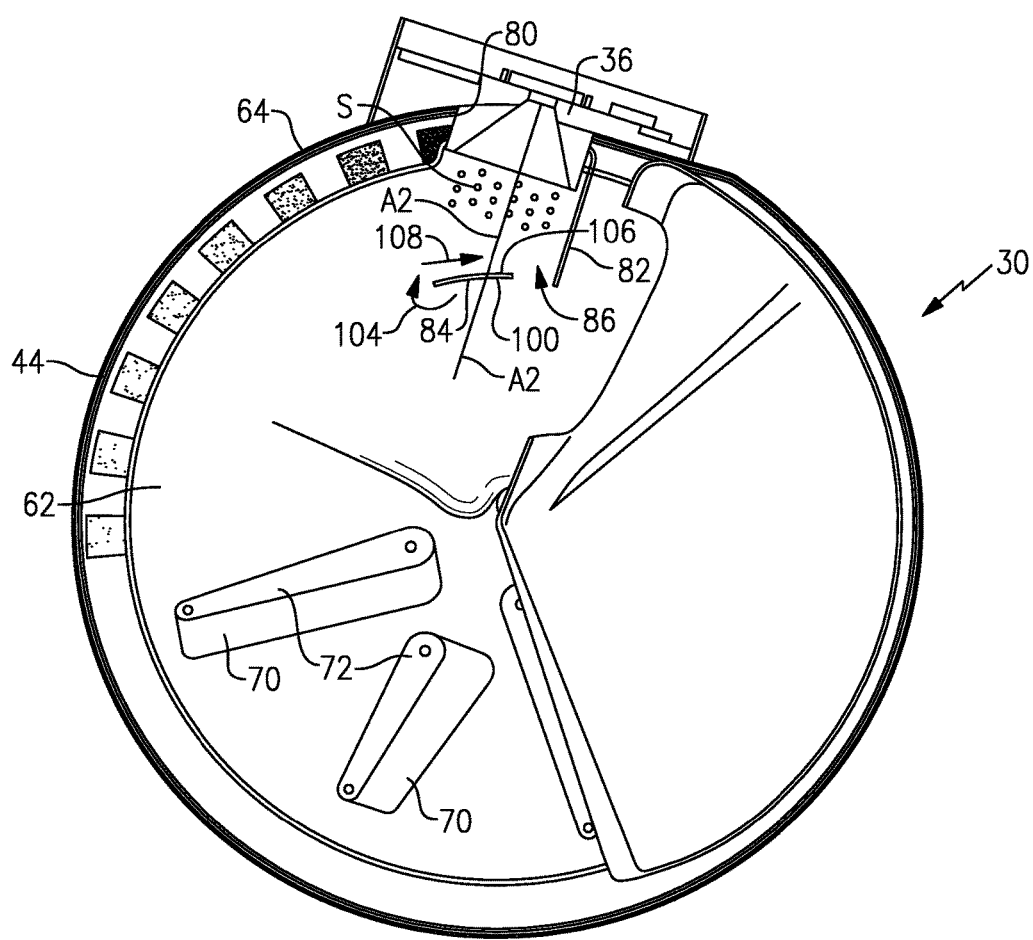
FIG. 7 is an outlet end view in partial section showing the positions of the impactor and deflector in relation to a doser opening.

As shown in FIG. 7, the outer peripheral surface 64 of the mixer body includes a doser mount area with a doser opening 80 to receive the doser 36 (FIG. 1). The upstream and downstream baffles 60, 62 are spaced apart from each other in an axial direction along a length of the mixer 30. The doser opening 80 for the doser 36 is positioned between the two baffles 60, 62 such that a reducing agent is sprayed into the swirling gas flow at a location that is adjacent to the inlet opening 66 (FIG. 2).

The mixer 30 defines a center axis A1 (FIG. 6) extending along a length of the mixer 30. The doser 36 defines a central doser axis A2 (FIG. 7) that is slightly offset relative to the center axis A1 of the mixer 30, i.e. A2 does not intersect A1.

In one example, the mixer 30 includes a deflector 82 and an impactor 84 positioned in an area between the upstream 60 and downstream 62 baffles. The deflector 82 is positioned between the inlet opening 66 and the doser opening 80 to protect spray at the doser opening 80 from direct impact by exhaust gas introduced into the mixer 30 through the inlet opening 66. The impactor 84 is positioned to face the doser opening 80. In one example, a portion of the impactor 84 is intersected by the central doser axis A2.

Figure 6:
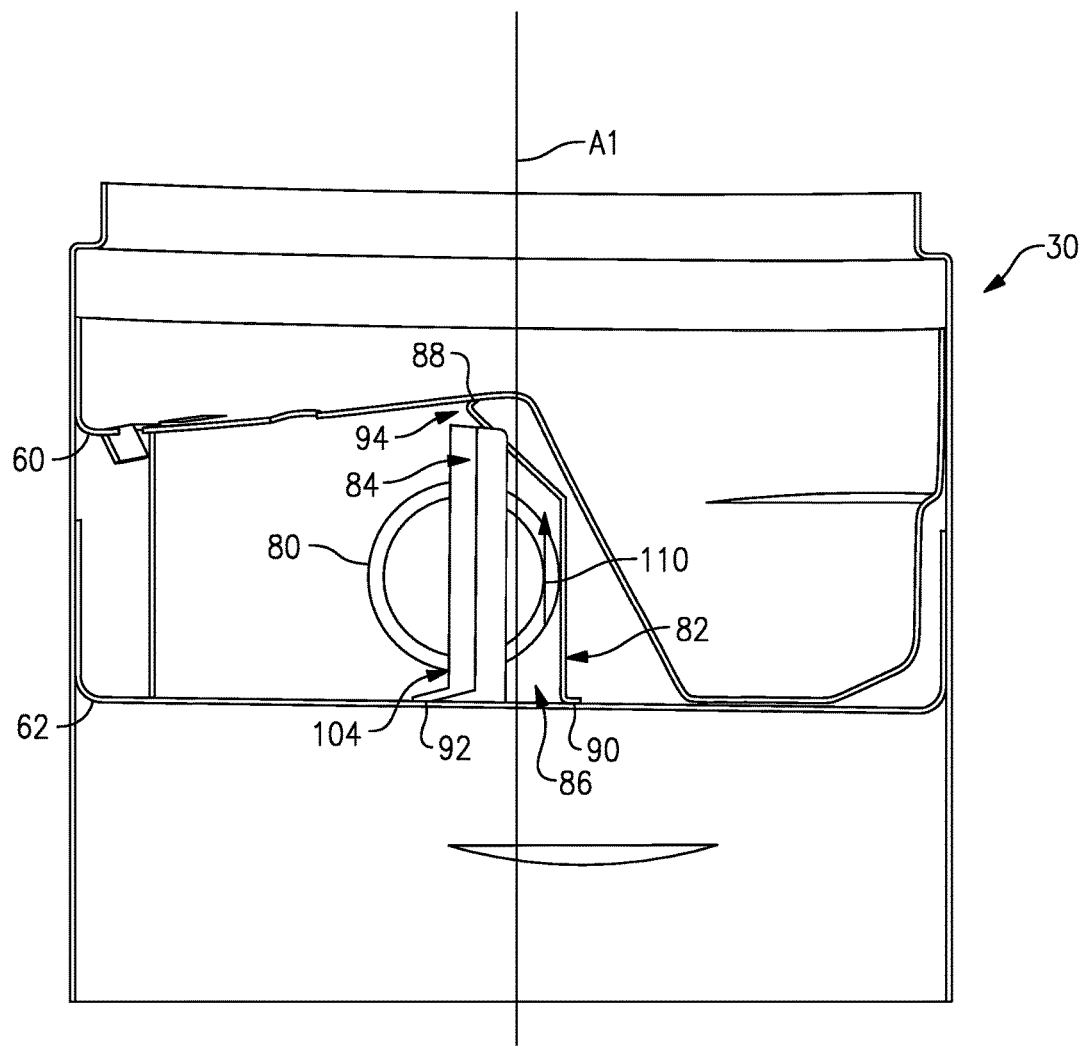
FIG. 6 is a side view in partial section showing the positions of the impactor and deflector in relation to a doser opening.

In one example, the deflector 82 and the impactor 84 are separated from each other by a gap 86 (FIG. 2). As shown in FIG. 6, the deflector 82 has a first end 88 fixed to the upstream baffle 60 and an opposite second end 90 fixed to the downstream baffle 62. The deflector 82 can be attached to the baffles using any of various attachment methods including welding, brazing, fastening, etc. Optionally, the deflector 82 could be integrally formed with one of the baffles 60, 62 and then attached to the other baffle 60, 62.

In one example, the impactor 84 is fixed only to the downstream baffle 62 as indicated at 92 in FIG. 6. The impactor 84 can be attached to the baffle 62 using any of various attachment methods including welding, brazing, fastening, etc. Optionally, the impactor 84 could be integrally formed with the downstream baffle 62. In either configuration, the impactor 84 is spaced from the upstream baffle 60 by a gap 94.

In one example, the deflector 82 (FIG. 4) has a first portion 96 and a second portion 98 that are non-coplanar. The first portion 96 extends from the downstream baffle 62 toward the upstream baffle 60 in a direction that is generally parallel to the central mixer axis A1. The second portion 98 extends from the first portion 96 toward the upstream baffle 60 in a direction that is transverse to the central mixer axis A1. The deflector 82 is thus configured to protect the spray from the doser 36 from being impacted directly by exhaust gases entering the mixer through the inlet opening 66 to allow initial spray development in an effective manner.

In one example, the impactor 84 comprises an arcuate wall 100 (FIG. 7), i.e. a wall with a slight curvature. The impactor 84 and deflector 82 facilitate the creation of a low pressure zone near the doser opening 80. This low pressure zone sucks exhaust flow (as represented by arrow 104). The sucked flow velocity is between 5 to 10 times lower than exhaust flow velocity at the main opening 66. The low exhaust velocity allows the droplets to penetrate to a great extent into the zone created between the inlet baffle 60, outlet baffle 62, deflector 82 and impactor 84. The exhaust flow sucked in this zone is loaded with products from doser spray (S).

Figure 4:
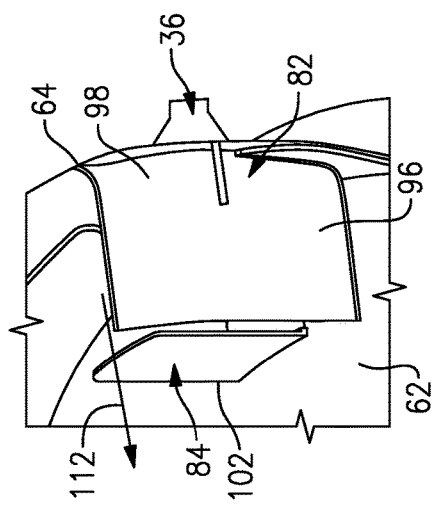
FIG. 4 is an enlarged view of an impactor and deflector as positioned within the mixer of FIG. 2.
Figure 5:
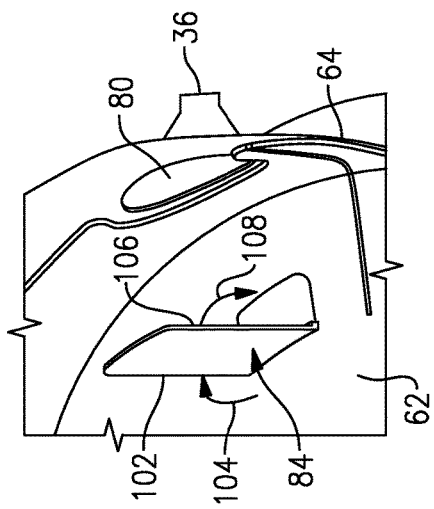
FIG. 5 is a view similar to that of FIG. 4 but with the deflector removed.
Figure 3:
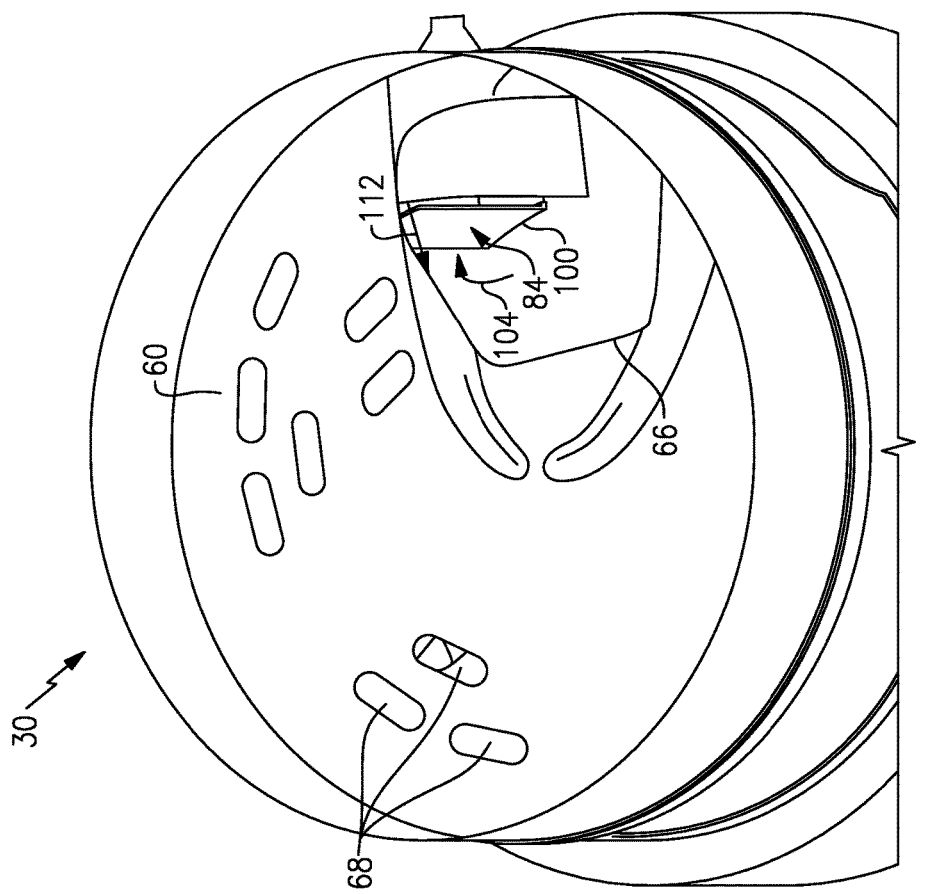
FIG. 3 is perspective view of the mixer of FIG. 2 from an inlet end.

The deflector 82 and impactor 84 increase doser spray penetration in the following manner. The exhaust gas enters the inlet opening 66 (FIG. 3) swirls around a first side edge 102 (FIG. 5) of the impactor 84 as indicated at 104, and is then directed along a front face 106 of the impactor 84 as indicated at 108 to mix with droplet spray S entering the mixer 30 via the doser opening 80. Then, as indicated at 110 (FIG. 6), a mixture of exhaust gas and droplets is directed by a second low pressure zone generated at the backside of the inlet baffle 60 close to the top portion of the opening 66 toward the upstream baffle 60, and then across the upstream baffle 60 toward a center of the mixer 30 as indicated at 112 (FIG. 4). The second low pressure zone can be controlled by the upstream baffle covering up the top portion of the opening 66, the larger the lip the greater the sucking force and consequently a greater proportion of droplets will penetrate into the center of the mixer.

As such, the mixer 30 utilizes the deflector 82 and impactor 84 to create a swirl box that provides for a very thorough mixing of spray droplets and exhaust gas within a compact, i.e. short length, configuration. A volume defined between the doser opening 80, the deflector 82, the impactor 84, and the upstream 60 and downstream 62 baffles forms the swirl box. The exhaust flow enters the box via the low pressure area as indicated at 104 and then swirls and picks up droplets as indicated at 108 and 110. A lower pressure area is also created near the top of the inlet hole 66 further facilitates the swirling effect and deep spray penetration towards the mixer center. Thus, this mixer 30 provides thorough mixing of small droplet size spray in a short mixer length having a large exhaust cross-section.

Figure 9:
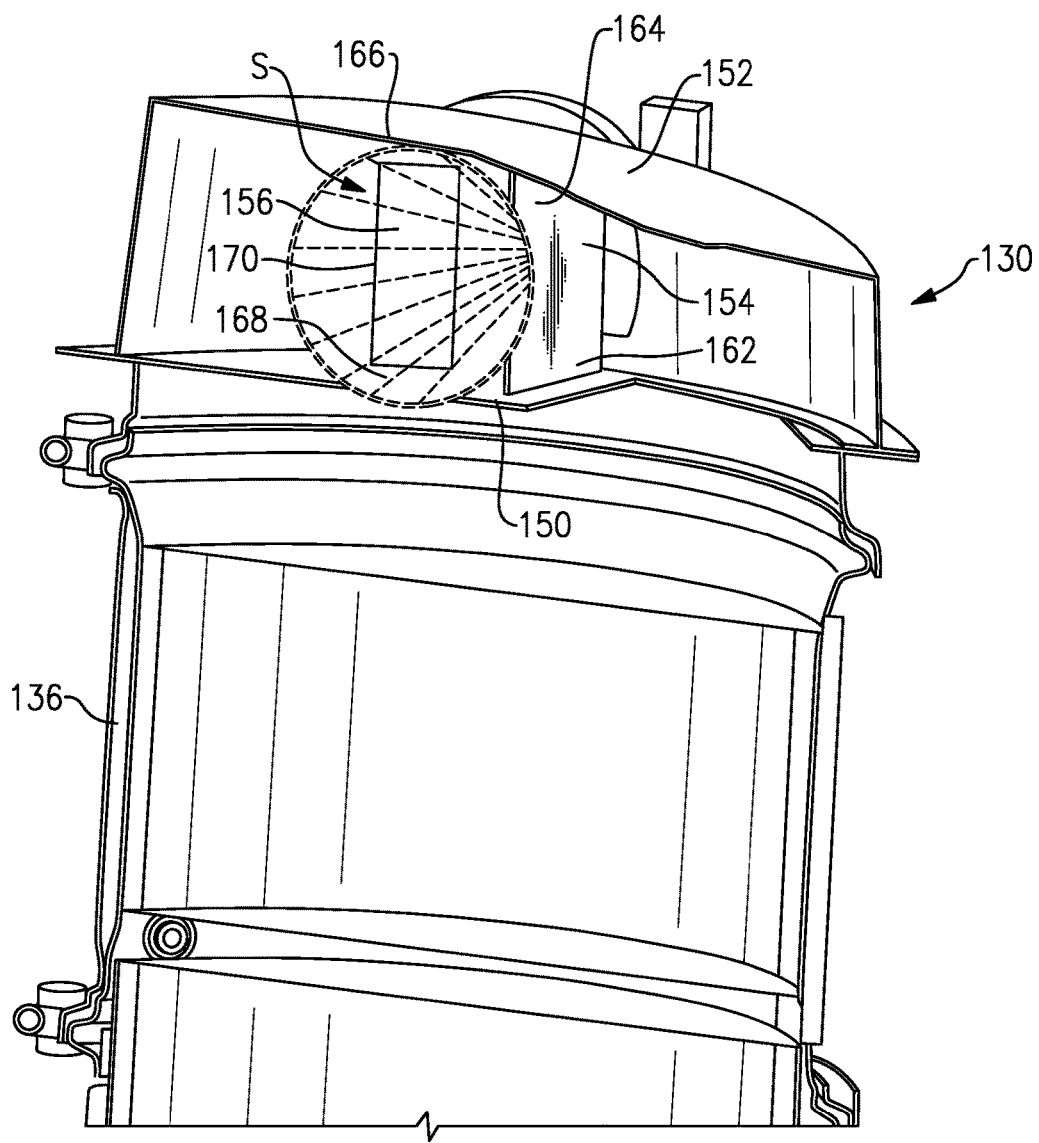
FIG. 9 is a cross-sectional view of the mixer of FIG. 8.
Figure 10:
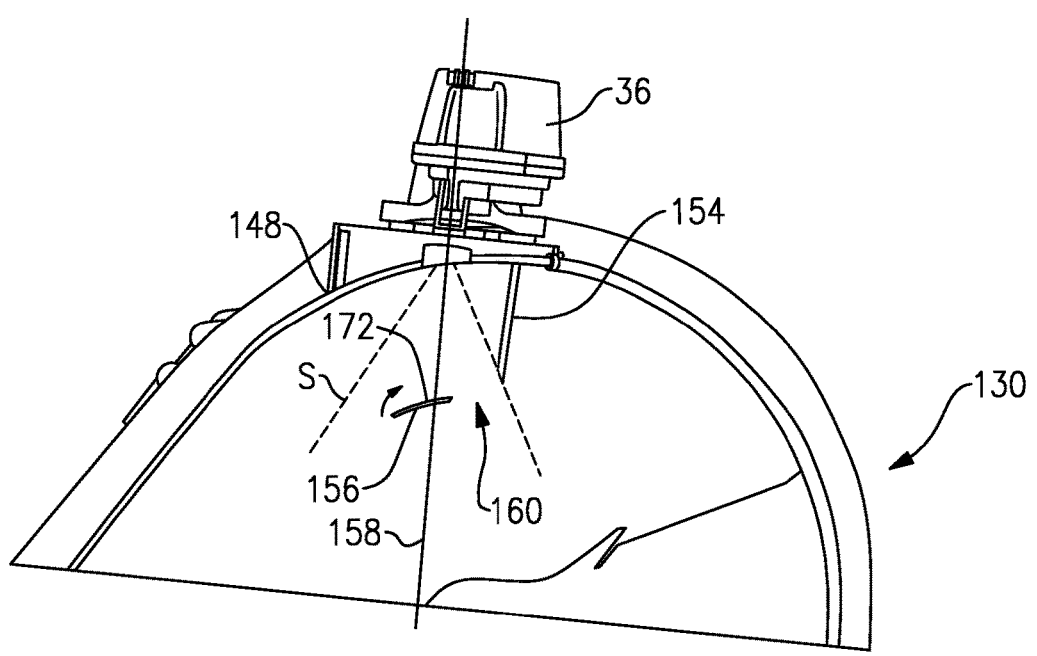
FIG. 10 is an end view of the mixer of FIG. 8

FIGS. 8-10 show another example of a mixer 130 positioned downstream from an outlet 132 of a DOC 134 or DPF 136 and upstream of an inlet 138 of a SCR catalyst 140. The upstream catalyst and downstream catalyst are in parallel in this configuration, i.e. have a U-shaped configuration. As discussed above, the mixer 130 is used to generate a swirling or rotary motion of the exhaust gas. This injection system 132 is also used to inject a reducing agent in this configuration in a manner as described above.

As shown in FIG. 8, the mixer 130 comprises a mixer body having an inlet end 142 configured to receive the engine exhaust gases and an outlet end 144 to direct a mixture of swirling engine exhaust gas and products transformed from urea to the SCR catalyst 140. The mixer operates in a manner similar to that of the mixer 30 described above and includes an outer peripheral surface 146 with a doser mount area having a doser opening 148 to receive the doser 136 (FIG. 8). The doser opening 148 for the doser 136 allows a reducing agent to be sprayed into the swirling gas flow (see spray cone S in FIG. 9).

Further, as shown in FIG. 9, the mixer body includes an interior baffle 150, which operates in a manner similar to the upstream baffle 60, and a cover 152, which operates in a manner similar to the downstream baffle 62. The interior baffle 150 is configured to initiate swirling of the exhaust gas flow. The mixer 130 includes a deflector 154 and an impactor 156 positioned in an area between the interior baffle 150 and the cover 152. The deflector 154 is positioned between an inlet opening at the interior baffle 150 and the doser opening 148 to protect spray at the doser opening 148 from direct impact by exhaust gas introduced into the mixer 130 through the inlet opening. The impactor 156 is positioned to face the doser opening 148. In one example, a portion of the impactor 156 is intersected by a central doser axis 158.

In one example, the deflector 154 and the impactor 156 are separated from each other by a gap 160 (FIG. 10). The deflector 154 has a first end 162 fixed to the interior baffle 150 and an opposite second end 164 fixed to the cover 152 (FIG. 9). The deflector 154 can be attached using any of various attachment methods including welding, brazing, fastening, etc. Optionally, the deflector 154 could be integrally formed with one of the interior baffle or cover and then attached to the other of the interior baffle and cover. The deflector 154 is configured to protect the spray S from the doser 136 from being impacted directly by exhaust gases entering the mixer through the inlet opening at the interior baffle 150 to allow initial spray development in an effective manner.

In one example, the impactor 156 is fixed only to the cover 152 as indicated at 166 in FIG. 9. The impactor 156 can be attached using any of various attachment methods including welding, brazing, fastening, etc. Optionally, the impactor 156 could be integrally formed with the cover 152. In either configuration, the impactor 156 is spaced from the interior baffle 150 by a gap 168.

In one example, the impactor 156 comprises an arcuate wall (FIG. 10), i.e. a wall with a slight curvature. The impactor 156 and deflector 154 facilitate the creation of a low pressure zone near the doser opening 148. This low pressure zone sucks exhaust flow having a flow velocity that is between 5 to 10 times lower than exhaust flow velocity at the inlet opening 166, which allows spray droplets to penetrate to a great extent into the zone created between the interior baffle 150, cover 152, deflector 154 and impactor 156. The exhaust flow sucked in this zone is loaded with products from doser spray (S).

The deflector 154 and impactor 156 increase doser spray penetration in the following manner. The exhaust gas enters the inlet opening at the interior baffle 150 swirls around a first side edge 170 (FIG. 9) of the impactor 156, and is then directed along a front face 172 of the impactor 156 (FIG. 10) to mix with droplet spray S entering the mixer 130 via the doser opening 148. Then, a mixture of exhaust gas and droplets is directed by a second low pressure zone generated at the backside of the interior baffle 150, and then across the interior baffle 60 toward a center of the mixer 130. As such, the mixer 130 utilizes the deflector 154 and impactor 156 to create a swirl box that provides for a very thorough mixing of spray droplets and exhaust gas within a compact, i.e. short length, configuration in a manner similar to that described above.

Figure 11:
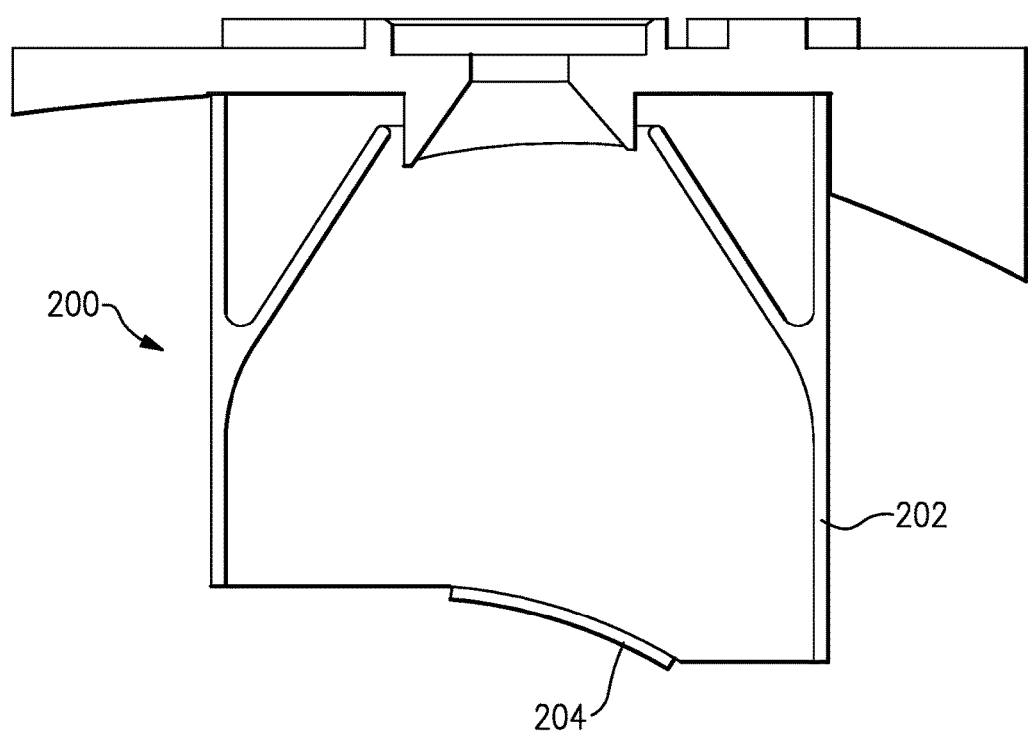
FIG. 11 is a cross-sectional view of another example of a mixer having a deflector and impactor in a one-piece configuration.
Figure 12:
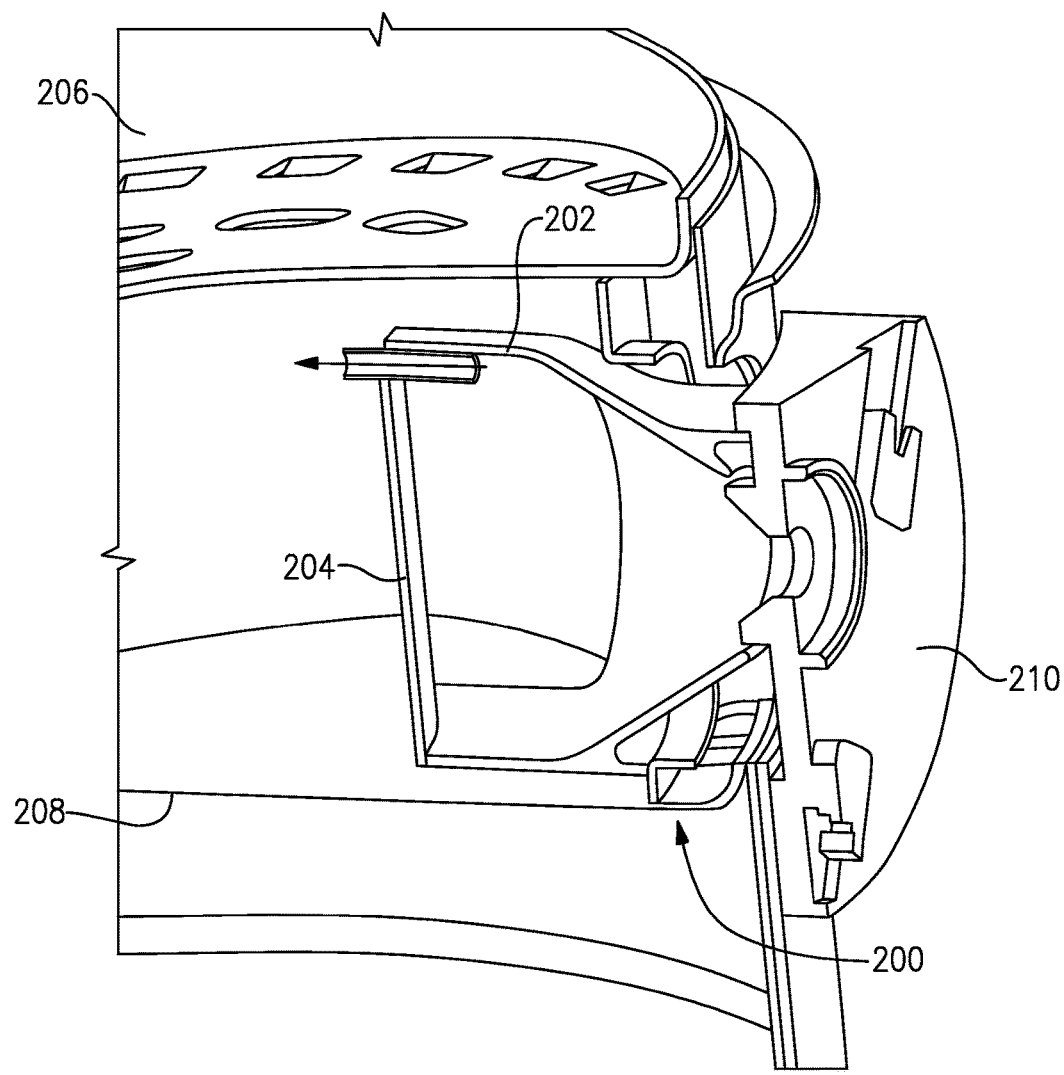
FIG. 12 is another cross-sectional view of the mixer of FIG. 11.

FIGS. 11-12 show another example of a swirl box 200 having a deflector 202 and impactor 204 in one-piece. As shown in FIG. 12, there in an inlet baffle 206, an outlet baffle 208, and a doser mount area 210. The one-piece structure including the deflector 202 and the impactor 204 are positioned between the baffles 206, 208. The swirl box 200 operates in the manner as described above.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A vehicle exhaust system comprising:
a mixer having an inlet end configured to receive engine exhaust gases and an outlet end configured to conduct engine exhaust gases to a downstream exhaust component, and wherein the mixer includes an upstream baffle with at least one inlet opening and a downstream baffle with at least one outlet opening, the upstream and downstream baffles being surrounded by an outer peripheral wall;

a doser configured to spray a reducing agent into the mixer, the doser defining a central doser axis and being mounted at a doser opening within the outer peripheral wall;

a deflector positioned within the mixer between the inlet opening and the doser opening to protect spray at the doser opening from direct impact with exhaust gas introduced into the mixer via the inlet opening; and an impactor positioned within the mixer such that a portion of the impactor intersects the doser axis.

2. The vehicle exhaust system according to claim 1 wherein the at least one inlet opening comprises a plurality of openings with one of the plurality of the openings being larger than the remaining openings such that a majority of the engine exhaust gases flow through the one opening, and wherein the deflector is positioned between the one opening and the doser opening.

3. The vehicle exhaust system according to claim 2 wherein the upstream baffle and the plurality of openings cooperate to initiate a swirling motion to the exhaust gas as the exhaust gas enters the inlet end of the mixer.

4. The vehicle exhaust system according to claim 1 wherein the mixer defines a central mixer axis and wherein the central doser axis does not intersect the central mixer axis.

5. The vehicle exhaust system according to claim 1 wherein the impactor and deflector are separated from each other by a gap.

6. The vehicle exhaust system according to claim 1 wherein the deflector has one end fixed to the upstream baffle and an opposite end fixed to the downstream baffle.

7. The vehicle exhaust system according to claim 1 wherein the impactor is fixed only to the downstream baffle.

8. The vehicle exhaust system according to claim 7 wherein the impactor is spaced from the upstream baffle by a gap.

9. The vehicle exhaust system according to claim 1 wherein a volume defined between the doser opening, the deflector, the impactor, and the upstream and downstream baffles forms a swirl box.

10. The vehicle exhaust system according to claim 1 wherein the deflector has first and second portions that are non-coplanar.

11. The vehicle exhaust system according to claim 10 wherein the mixer defines a central mixer axis and wherein the first portion extends from the downstream baffle in a direction that is generally parallel to the central mixer axis and the second portion extends from the first portion toward the upstream baffle in a direction that is transverse to the central mixer axis.

12. The vehicle exhaust system according to claim 1 wherein the impactor comprises an arcuate wall that creates a low pressure area near the doser opening.

13. The vehicle exhaust system according to claim 1 wherein the exhaust gas enters the inlet opening, swirls around a first side edge of the impactor and is directed along a front face of impactor to mix with droplets entering the mixer via the doser opening, and wherein a mixture of exhaust gas and droplets is directed toward the upstream baffle and then across the upstream baffle toward a center of the mixer by a low pressure zone generated at a backside of the upstream baffle close to a top portion of the inlet opening.

14. The vehicle exhaust system according to claim 1 wherein the downstream exhaust component comprises a SCR catalyst.

15. A mixer comprising:

an upstream baffle with at least one inlet opening configured to receive engine exhaust gas;

a downstream baffle with at least one outlet opening configured to conduct engine exhaust gases to a downstream exhaust component;

an outer peripheral wall surrounding the upstream and downstream baffle and including a doser opening configured to receive a doser;

a deflector positioned between the inlet opening and the doser opening to protect spray at the doser opening from direct impact with exhaust gas from the inlet opening; and an impactor positioned adjacent the deflector and facing the doser opening.

16. The mixer according to claim 15 including a doser mounted at the doser opening to spray a reducing agent into an area between the upstream and downstream baffles, and wherein the outer peripheral wall defines a central mixer axis and the doser defines a central doser axis that does not intersect the central mixer axis, and wherein a portion of the impactor intersects the central doser axis.

17. The mixer according to claim 15 wherein the impactor and the deflector are separated from each other by a gap.

18. The mixer according to claim 17 wherein the deflector has a first portion fixed to the upstream baffle and a second portion fixed to the downstream baffle, the first and second portions being non-coplanar.

19. The mixer according to claim 18 wherein the impactor is only fixed to the downstream baffle and is separated from the upstream baffle by a gap.

* * * * *